United States Patent
Franz

(10) Patent No.: US 6,976,574 B2
(45) Date of Patent: Dec. 20, 2005

(54) ARRANGEMENT FOR TRANSFERRING PLATES BETWEEN A PLATE CONVEYOR AND A STORAGE RACK OR SIMILAR STRUCTURE

(75) Inventor: Roland Franz, Fünfstetten (DE)

(73) Assignee: J. Grenzebach Maschinenbau GmbH, Asbach-Bäumenheim (DE)

( * ) Notice: Subject to any disclaimer, the term of this patent is extended or adjusted under 35 U.S.C. 154(b) by 0 days.

(21) Appl. No.: 10/885,372

(22) Filed: Jul. 6, 2004

(65) Prior Publication Data
US 2005/0002761 A1  Jan. 6, 2005

(30) Foreign Application Priority Data
Jul. 4, 2003  (DE) ................... 103 30 160

(51) Int. Cl.[7] ............................................. B65G 47/00
(52) U.S. Cl. .................... 198/468.4; 414/793
(58) Field of Search .................. 414/788.5, 793; 198/468.01, 468.04, 468.2

(56) References Cited

U.S. PATENT DOCUMENTS

| | | | | |
|---|---|---|---|---|
| 2,049,850 A | * | 8/1936 | Lytle et al. ................. | 414/728 |
| 3,587,888 A | * | 6/1971 | Warren ....................... | 414/728 |
| 3,856,607 A | * | 12/1974 | Faltot et al. ................ | 156/351 |
| 3,860,125 A | * | 1/1975 | Johnson et al. ............. | 198/394 |
| 3,920,128 A | * | 11/1975 | Baker ......................... | 414/737 |
| 4,674,935 A | * | 6/1987 | Feliks et al. ............. | 414/797.8 |
| 4,770,120 A | * | 9/1988 | Komatsu et al. ............ | 118/669 |
| 5,030,059 A | * | 7/1991 | Favre ...................... | 414/798.5 |
| 5,193,967 A | * | 3/1993 | Sartorio ..................... | 414/797 |
| 5,700,128 A | * | 12/1997 | Tonnigs et al. .......... | 414/789.1 |

* cited by examiner

*Primary Examiner*—Richard Ridley
(74) *Attorney, Agent, or Firm*—Klaus J. Bach

(57) ABSTRACT

In an arrangement for the transfer of plates between a plate conveyor and a holding structure by a transport arm, which is pivotally supported with one end on a support structure and pivotally supports at its other end a plate holder for engaging a plate selectively from the top or the bottom thereof, and wherein the conveyor includes a recess for receiving the plate holder to permit engagement of a plate on the conveyor from the bottom thereof, two linkages are provided for controlling the pivot movement of the plate holder during the transfer of the plates and provided with releasable engagement structures for a selective connection with the plate holder to control the pivoting of the plate holder during plate transfer such that the plate surface opposite the plate holder is disposed adjacent the holding structure.

3 Claims, 3 Drawing Sheets

ARRANGEMENT FOR TRANSFERRING PLATES BETWEEN A PLATE CONVEYOR AND A STORAGE RACK OR SIMILAR STRUCTURE

BACKGROUND OF THE INVENTION

The invention relates to an arrangement for the transfer of plates between a plate conveyor and a storage rack or similar structure by means of a transport arm, which is arranged at the storage rack and is provided at its free end with a plate holder for engaging a plate to be transferred and which is movable between the plate conveyor and the storage structure.

The invention is particularly suitable for handling glass plates where, at the end of a glass manufacturing line, formatted flat glass plates are carried on a plate conveyor and, at the end of the plate conveyor, are taken from the conveyor and transferred to a storage rack or a similar structure. However, the application of the invention is not limited to the handling of glass plates but the arrangement according to the invention is suitable for other kinds of plates which are carried on a plate conveyor and have to be transferred from the conveyor to a storage structure or a truck or another structure. Of course, the arrangement according to the invention may also be used for the reversed procedure, that is, for the transfer from a storage structure to a plate conveyor.

During the manufacture of glass panels, a flat, continuously moving glass plate strip is formed by the deposition of a glass melt on a liquid metal bath. The flat glass strip floating on the liquid metal bath (designated therefore generally as float glass), after sufficient cooling and solidification, reaches a cutting station where the glass is cut by longitudinal and transverse cutters into smooth plates of the desired format. The cut glass plates are then transported by a conveyor to stacking locations where they are stored in stacks until they are further processed or transported elsewhere.

If the glass plates must subsequently be coated for example for providing them with certain optical properties such as light permeability, reflection behavior, optical appearance or heat radiation permeability as it is common for construction glass panels, the side of the glass to be coated must be kept free of impurities or detrimental deposits or disturbances of any type. Therefore the so-called air side of the flat glass (in contrast to the bath side, which is the side with which the glass floats during manufacture on the liquid bath), which remains free from any mechanical effects also during the transport of the glass plate on the conveyor to the stacking location since only the bath side of the glass plates is contacted by rollers of the conveyor, is selected for coating purposes.

However, during removal of the glass plates from the conveyor, the glass plates are engaged at the air sides thereof by a plurality of suction heads arranged at the end of a robotic arm and are lifted off the conveyor and transferred to the storage structure. During this procedure, impurities or tracks can be applied to the air side of the glass plates. Such tracks are normally not visible, but, upon coating of the glass surface, they may be disturbing and become visible. With automotive or building glass panels then a ring pattern may form at the suction head engagement locations of the glass panels when they are fogging up, which is very undesirable.

EP 1 298 080 A1 (U.S. Pat. No. 6,659,265) discloses an apparatus for the transfer of plates from a plate transport device to a storage rack which attends to the same problem. There, a robot arm, which is arranged at a plate transfer location, has at its free end a suction from which can be pivoted selectively into a vertically upward oriented position and which can be introduced into open areas in the plate conveyor in order to engage a glass plate on the plate conveyor at the bottom side thereof for moving it to the storage rack. However, the suction frame can also be pivoted into a downwardly oriented position for engaging the plates at the air sides thereof where this is of no importance for the further use of the glass plates. With this arrangement, a motor drive is required for pivoting the suction frame into the respective desired position. The motor drive with the respective means for the accurate positioning of the suction frame in the respective pivot position involves an expensive design and service requirements and makes the apparatus more prone to failures.

It is therefore the object of the present invention to provide an arrangement for the transfer of plates, particularly glass plates, from a plate conveyor to a storage rack or similar structure which permits the engagement of the plates from the bottom sides thereof, namely the bath side of glass plates, and which does not require a motor operated pivoting mechanism between the robot arm and the suction frame.

SUMMARY OF THE INVENTION

In an arrangement for the transfer of plates between a plate conveyor and a holding structure by a transport arm which is pivotally supported with one end on a support structure and pivotally supports, at its other end, a plate holder for engaging a plate selectively from the top or the bottom thereof, and wherein the conveyor includes a recess for receiving the plate holder to permit engagement of a plate on the conveyor from the bottom thereof, two linkages are provided for controlling the pivot movement of the plate holder during the transfer of the plates and provided with releasable engagement structures for a selective connection with the plate holder to control the pivoting of the plate holder during plate transfer such that the plate surface opposite the plate holder is disposed adjacent the holding structure.

With the arrangement according to the invention, the suction frame (or generally the plate holder) is pivoted by way of a mechanical linkage. Two mechanical linkages are connected to a suction frame and, by way of switchable clutch, either one or the other of the linkages acts on the suction frame. One of the linkages causes an orientation of the suction frame with the suction heads facing downwardly for engaging the top surfaces of the plates and the other linkage causes the suction frame to pivot downwardly with the suction heads facing upwardly for engaging the bottom surfaces of the plates. The suction frame is pivoted in each case in cooperation with the pivot movement of the robot arm with the respective linkage in such a way that the proper pivot position of the suction frame for the respective position of the robot arm is established. The robot arm is in the form of a simple pivot arm.

Below an embodiment of the invention will be described in greater detail on the basis of the accompanying drawings.

DESCRIPTION OF A PREFERRED EMBODIMENT

Figure 1:
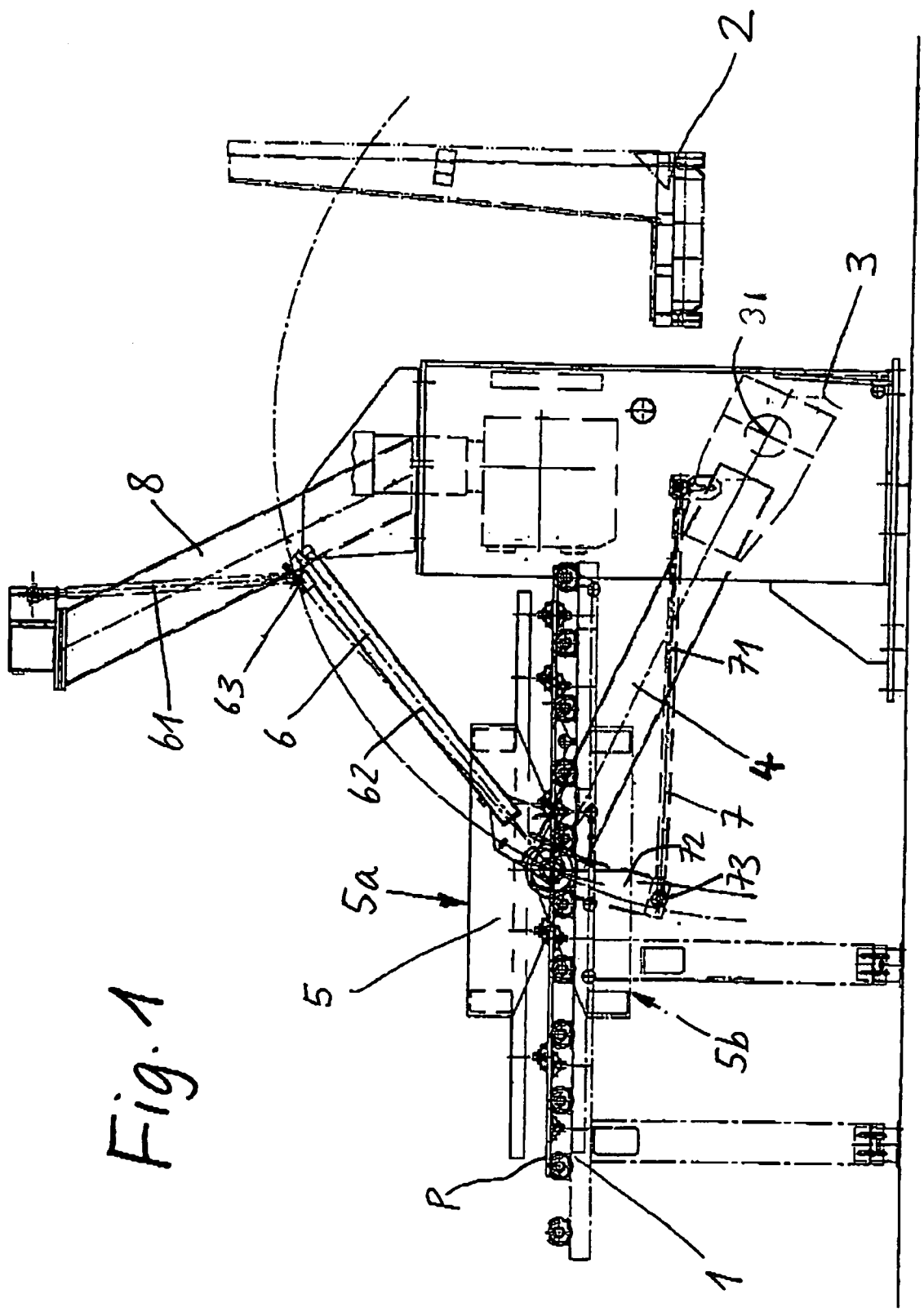
FIG. 1 is a schematic side view of the arrangement according to the invention wherein the suction frame is indicated in both possible positions.

The drawings are schematic and only serve as means for facilitating an understanding of the inventive concept. The figures show the end of a plate conveyor 1, on which glass plates cut into certain formats are supplied. One glass plate indicated by P is visible on the conveyor 1. At the end of the conveyor 1, there is a transfer station for transferring the glass plate P from the conveyor to a storage rack 2.

The arrangement for transferring the glass plate P in the transfer location comprises a support structure 3 with a transport arm 4 and a suction frame 5 mounted thereon. The transport arm 4 is supported on the support structure 3 so as to be pivotable about an axis 31 and carries the suction frame 5 at its free end.

The plate conveyor 1 is provided with a recess (which is not visible in the schematic side view of FIG. 1) into which the suction frame 5 can be moved for engaging a plate from the bottom side thereof.

The suction frame 5 is pivotable into a position 5a, in which the suction heads thereof are facing downwardly for engaging a plate P at the topside thereof, and into a position 5b, in which the suction heads face upwardly for engaging a plate from the bottom side thereof.

In FIG. 1 both positions are shown. The suction head is shown in full lines in the downwardly facing position and it is shown in dash-dotted lines in the upwardly facing position.

The selective pivoting of the suction head is achieved by means of the mechanical linkages 6 and 7. The one linkage 6 comprises members 61 and 62, which are interconnected by a joint 63. The member 61 is arranged in an arm 8 extending upwardly from a support structure 2 and the other member 62 is a pivot lever connected to the suction frame 5. The other linkage 7 comprises members 71 and 72, which are interconnected by a joint 73. The member 71 is pivotally supported on the support structure 2 and the member 72 is a pivot lever and is connected to the suction frame 5.

The members 62 and 72 of the linkages 6 and 7 are connected to the suction frame 5 by way of a switchable engagement mechanism (not shown) such that the selectively the one or the other of the linkages 6 and 7 can be mechanically coupled to the suction frame 5 during movement of the transport arm 4. The other linkage idles along with the suction frame 5. If the linkage 6 is coupled to the suction frame 5, the suction frame 5 is pivoted, upon pivoting of the transport arm 4 toward the conveyor 1, automatically to its downwardly oriented position 5a for engaging the top side of a plate P. If the linkage 7 is effectively coupled to the suction frame 5, the suction frame 5 is pivoted, upon pivoting of the transport arm 3 toward the plate conveyor, automatically to its upwardly oriented position 5b for engaging a plate P from the bottom side thereof. Upon pivoting of the transport arm 3 in a direction toward the storage rack 2 the suction frame 5 is pivoted in both cases to the desired storage orientation together with glass plate P held by the suction frame 5.

Figure 2:
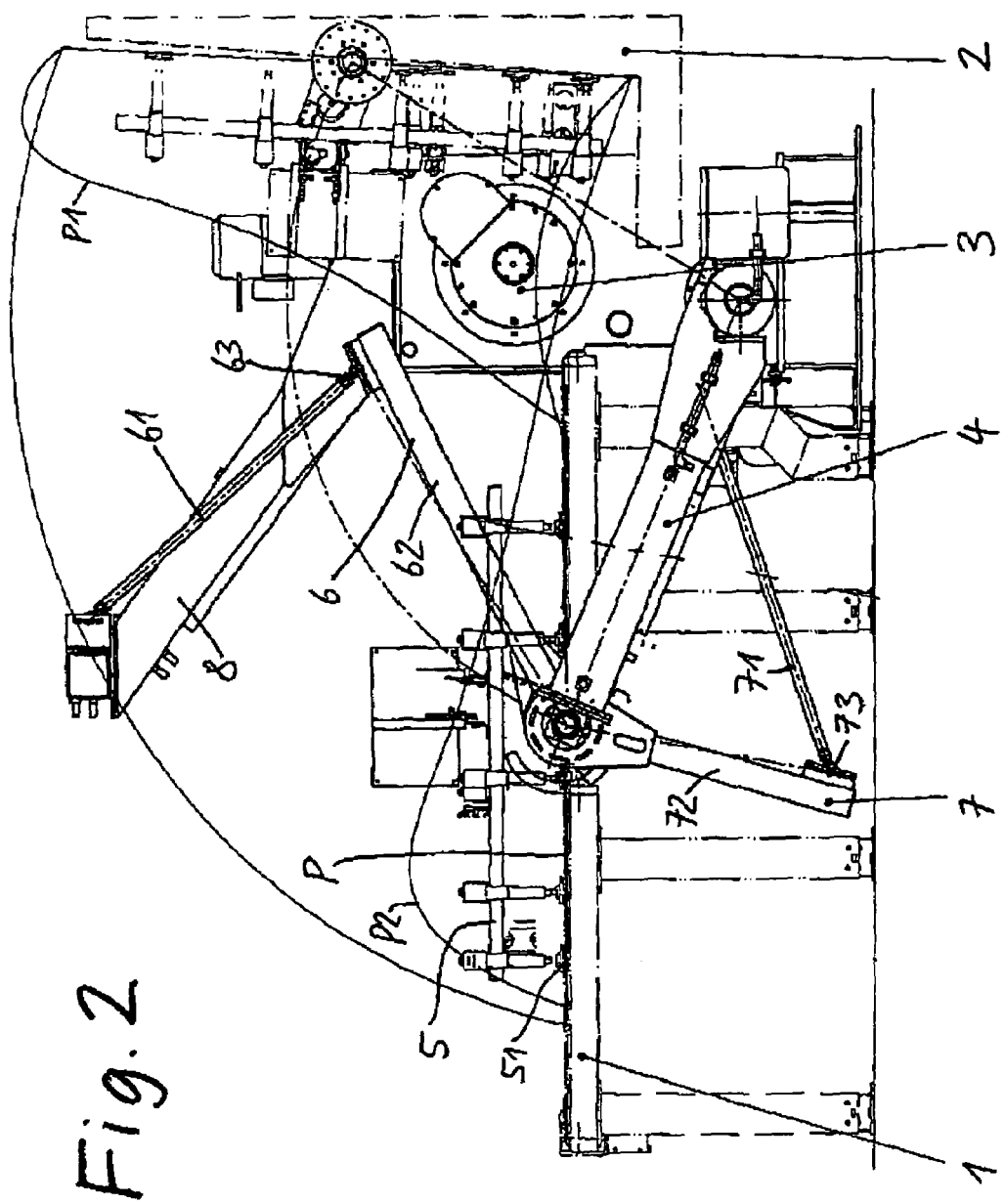
FIG. 2 is a detailed side view of the arrangement wherein the suction frame is pivoted into a downwardly facing position for engaging the top side of a plate.
Figure 3:
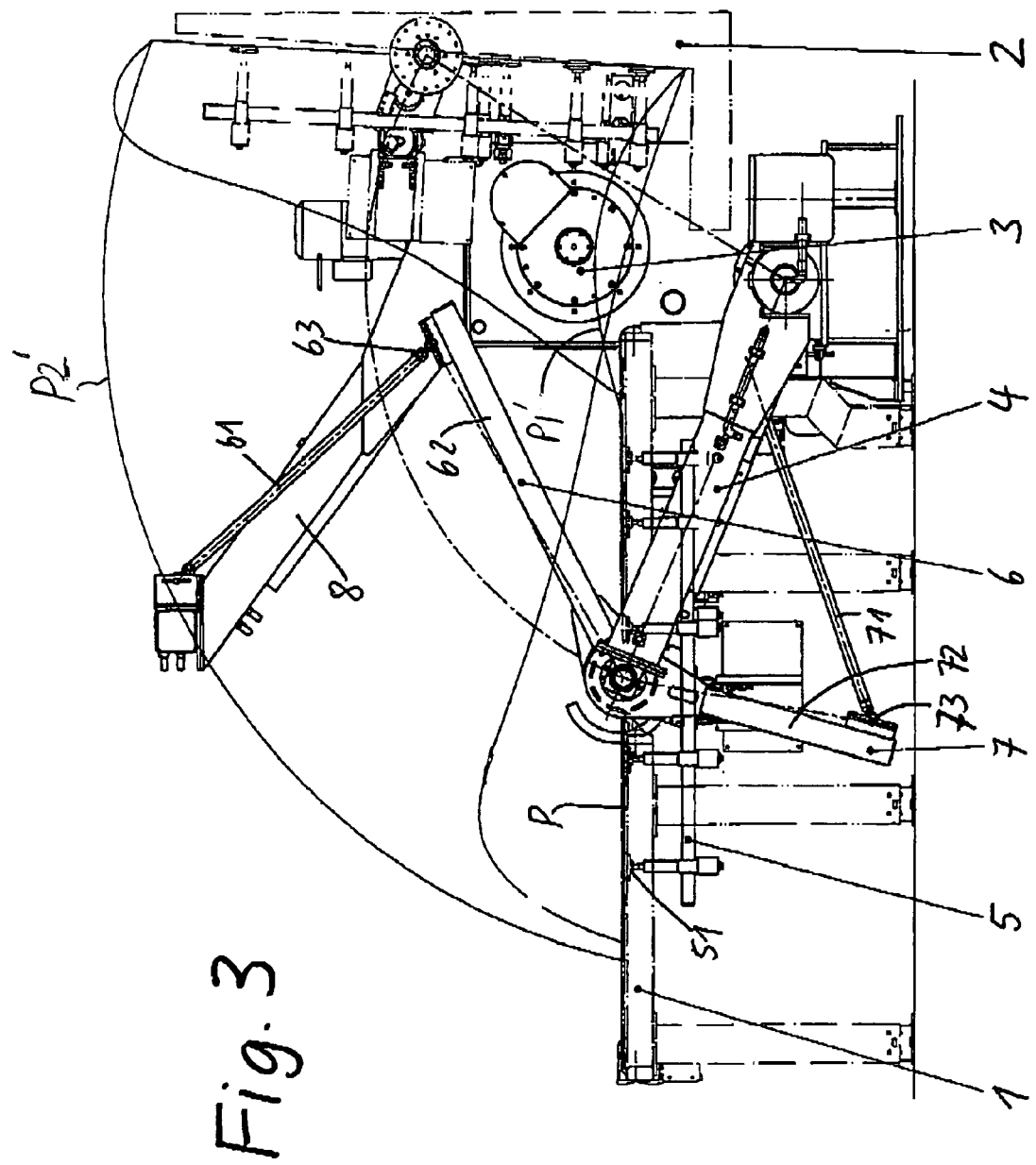
FIG. 3 is a side view similar to that of FIG. 2, wherein the suction frame is pivoted into an upwardly facing position for engaging the bottom side of a plate.

FIG. 2 shows the mechanism in a position in which the suction frame 5 is pivoted so as to face downwardly for engaging a plate P from the top side thereof and FIG. 3 shows the mechanism with the suction frame 5 pivoted so as to face upwardly for engaging a plate P from the bottom side thereof.

FIGS. 2 and 3 show the arrangement in somewhat greater detail than FIG. 1. Also, the suction frame 5 is shown in greater detail and also the suction heads 51 are indicated. Also, the transport arm 4 and the linkages 6 and 7 in connection with members 62 and 72 in the form of pivot arms are clearly visible. At the same time, the curves P1 and P2 and, respectively P1' and P2' shown in FIGS. 2 and 3 indicate the path of movement of the front and rear edges of the plate P during transfer of the plate P from the plate conveyor 1 to the storage rack 2 upon pivoting of the transport arm 4 and the resulting pivoting of the suction frame 5 under the control of the linkage 6 or, respectively, the linkage 7.

What is claimed is:

1. An arrangement for transferring plates between a plate conveyor (1) and a holding structure (2) comprising:

a support structure (3), a transport arm (4) pivotally supported with one end on said support structure (3) and carrying, at its free end remote from said support structure (3), a plate engagement device (5) for engaging and holding a plate P to be transferred between said plate conveyor and said holding structure (2), said plate engagement device (5) being pivotally supported on said transport arm (4) and having engagement devices selectively facing downwardly for engaging a plate (P) on said plate conveyor (1) from the top side thereof or facing upwardly so as to engage said plate (P) from the bottom side thereof, said plate conveyor (1) having recesses permitting the introduction of the plate engagement device (5) into the plate conveyor (1) below a plate disposed on the conveyor (1) to permit engagement of a plate P disposed on the conveyor (1) from the bottom of the plate P, and said arrangement including two separate linkages connected with one of their ends to said support structure (3) and being provided at their opposite ends with an engagement mechanism for operative connection to the plate engagement device (5) such that selectively either one of the two linkages is connected to the plate engagement device (5) while the other is idled, said linkages being so arranged that, upon pivoting of the transport arm (4) with the plate engagement device (5) disposed above or respectively below the plate (P) controls the pivot movement of the plate engagement device (5) such that in each case, the face of the plate P opposite the plate engagement device (5) is disposed adjacent the holding structure (2).

2. An arrangement according to claim 1, wherein the plate engagement device (5) is a suction frame with a plurality of suction heads (51) forming engagement members.

3. An arrangement according to claim 1, wherein each linkage (6, 7) comprises a link member (61, 71) connected to the support structure (3, 8) and another link pivotally connected to the respective link member (61, 71) and to the engagement device (5) and being provided at the opposite end with an engagement structure including a coupling mechanism for coupling the respective link member (61, 71) to the plate engagement device (5) for controlling its pivot movement by the movement of the transport arm (4) depending on the position of the plate engagement device (5) below or above the plate (P).

* * * * *